ns Patent

United States Patent [19]
Harnisch

[11] 4,249,010
[45] Feb. 3, 1981

[54] NAPHTHOSTYRIL DYESTUFFS

[75] Inventor: Horst Harnisch, Cologne, Fed. Rep. of Germany

[73] Assignee: Bayer Aktiengesellschaft, Leverkusen, Fed. Rep. of Germany

[21] Appl. No.: 85,154

[22] Filed: Oct. 15, 1979

Related U.S. Application Data

[62] Division of Ser. No. 876,542, Feb. 9, 1978, abandoned, which is a division of Ser. No. 772,324, Feb. 25, 1977, Pat. No. 4,201,713.

[30] Foreign Application Priority Data

Feb. 27, 1976 [DE] Fed. Rep. of Germany ....... 2608020

[51] Int. Cl.$^3$ ................. C07D 263/08; C07D 277/62; C07D 417/00; C09B 57/00
[52] U.S. Cl. .................................. 548/159; 548/156; 548/217; 548/219; 548/328; 548/330
[58] Field of Search .............. 548/159, 156, 217, 219, 548/328, 330

Primary Examiner—Donald G. Daus
Assistant Examiner—D. B. Springer
Attorney, Agent, or Firm—Sprung, Felfe, Horn, Lynch & Kramer

[57] ABSTRACT

The subject of the invention are dyestuffs of the formula

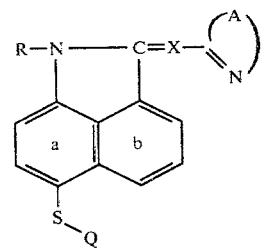

wherein
R is hydrogen or a hydrocarbon radical
Q is aryl
X is =C(W)— or =N—,
W is a nitrile ester or amide groups and
A represents the remaining members of a heterocyclic radical.

The dyestuff are preferably suitable for dyeing polyester fibres which are dyed in orange, red, violet or bluish shades with good fastness to light.

3 Claims, No Drawings

NAPHTHOSTYRIL DYESTUFFS

This is a division of application Ser. No. 876,542, filed Feb. 9, 1978, now abandoned, which is a division of application Ser. No. 772,324, filed Feb. 25, 1977, now U.S. Pat. No. 4,201,713, issued 3/18/80.

The invention relates to dyestuffs of the general formula

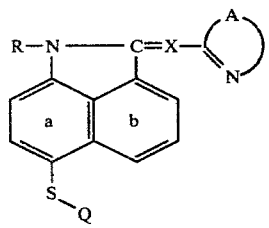

(I)

wherein
R represents hydrogen, alkyl, alkenyl, aralkyl, cycloalkyl, aryl or a 2-membered or 3-membered alkylene radical which is linked to the adjacent o-position of the ring a,
Q represents aryl or an o-arylene radical linked to the adjacent peri-position of the ring b,
X represents $=C(W)-$ or $=N-$,
W represents CN, $CONW^1W^2$, $COOW^3$ or a radical of the formula

$W^1$, $W^2$ and $W^3$ each represent hydrogen or alkyl and $W^1$ and $W^2$, conjointly with the common N atom, can also form a saturated 5-membered or 6-membered heterocyclic ring and
A represents the remaining members of a 5-membered or 6-membered, quasi-aromatic, optionally benzo-condensed heterocyclic radical, and the cyclic and acyclic radicals can contain the substituents customary in dyestuff chemistry,
and processes for their preparation, their use for dyeing high-molecular weight organic materials and materials dyed with these dyestuffs.

Within the scope of the invention, "substituents customary in dyestuff chemistry" are understood as, in particular, non-ionic radicals, that is to say radicals which do not confer solubility in water, as well as cationic and anionic radicals. Suitable cationic radicals are ammonium, cycloammonium and guanidinium radicals. Suitable anionic radicals are sulpho, sulphinatio, sulphato, disulphimide and carboxylate groups. Suitable non-ionic radicals are those defined in more detail below.

Alkyl radicals R preferably have 1–8 C atoms and can be interrupted by 1–2 oxygen atoms. Particularly preferred radicals are $C_1-C_6$-alkyl radicals and, in particular, $C_1-C_3$-alkyl radicals can be monosubstituted by OH, Cl, Br, CN, $C_1-C_4$-alkoxycarbonyl, carboxyl, carbamoyl, $C_1-C_4$-alkylcarbonyl or phenoxy. Examples which may be mentioned are: methyl, ethyl, β-cyanoethyl, β-chloroethyl, β-hydroxyethyl, β-hydroxy-n-propyl, β-hydroxy-γ-chloro-n-propyl, β-carboxyethyl, β-carbomethoxyethyl, β-carbethoxyethyl, β-carbobutoxyethyl, β-phenoxyethyl, β-carbamoylethyl, β-acetoxyethyl, β-methoxyethyl, β-ethoxyethyl, β-N-butoxyethyl, n-propyl, n-butyl, isobutyl, isoamyl and n-hexyl.

An alkenyl radical R which may be mentioned is the allyl radical.

Suitable aralkyl radicals R are, for example, phenyl-$C_1-C_3$-alkyl radicals, which can be substituted in the phenyl nucleus, for example by chlorine, bromine, $C_1-C_4$-alkyl or $C_1-C_2$-alkoxy. Preferred cycloalkyl radicals R are cyclohexyl radicals which can also carry 1–3 metyl groups.

Aryl radicals R which may be mentioned are phenyl radicals, which can be substituted, for example by chlorine, bromine, $C_1-C_4$-alkyl or $C_1-C_4$-alkoxy.

Preferred alkylene radicals R which are linked to the adjacent o-position of the ring a correspond to the formula $-CH_2-CH_2-$ or $-CH_2-CH_2-CH_2-$.

Suitable aryl radicals Q are, above all, phenyl radicals, which can be monosubstituted to disubstituted by $C_1-C_4$-alkyl, monosubstituted by $C_1-C_2$-alkoxy, monosubstituted to pentasubstituted by chlorine, monosubstituted to pentasubstituted by bromine or monosubstituted by amino, acylamino, such as $C_1-C_4$-alkylcarbonylamino, $C_1-C_4$-alkylsulphonylamino, phenylcarbonylamino, phenylsulphonylamino, acyloxy, such as $C_1-C_4$-alkylcarbonyloxy, phenylcarbonyloxy or phenylsulphonyloxy radicals, which can carry, as substituents, for example $C_1-C_4$-alkyl, $C_1-C_2$-alkoxy or chlorine, and alkylsuphonyloxy radicals which have at least 4 C atoms in the alkyl radical, hydroxyl, nitro or $-SO_2-T$, wherein T represents Cl, $O-T^1$ or $NT^2T^3$ and $T^1$ denotes hydrogen, an optionally substituted alkyl radical with at least 4 C atoms, preferably a $C_4-C_6$-alkyl radical, an optionally substituted cycloalkyl radical, preferably a cyclohexyl radical which is optionally substituted by 1–3 methyl groups, a phenyl-$C_1-C_3$-alkyl radical or an optionally substituted aryl radical, preferably a phenyl radical which is optionally substituted by $CH_3$, Cl or $CH_3O$, $T^2$ represents a $C_1-C_4$-alkyl radical which is optionally substituted by OH, Cl, CN, $C_1-C_4$-alkoxy, di-($C_1-C_2$-alkyl)-amino or tri-$C_1-C_2$-alkylammonium, or a phenyl-$C_1-C_2$-alkyl radical, cyclohexyl, cyclohexylmethyl or a phenyl radical which is optionally substituted by Cl, $CH_3$, $OCH_3$ or $OC_2H_5$ and $T^3$ represents hydrogen, a $C_1-C_4$-alkyl radical which is optionally substituted by CH, Cl, CN or $C_1-C_4$-alkoxy, or phenyl-$C_1-C_2$-alkyl or, conjointly with $T^2$, represents the remaining members of a 5-membered, 6-membered or 7-membered heterocyclic ring, such as pyrrolidine, piperidine, perhydroazepine, morpholine, piperazine or $N'-C_1-C_4$-alkylpiperazine (including the $N'$-β-hydroxyethyl derivative) or of a $N',N'$-di-($C_1-C_4$-alkyl)piperazinium radical. A further suitable aryl radical Q is the naphthyl radical.

o-Arylene radicals Q, which are linked to the adjacent peri-position of the ring b, are preferably o-phenylene radicals, which can be substituted by $C_1-C_4$-alkyl, $C_1-C_4$-alkoxy, chlorine, bromine or $SO_2-T$.

Heterocyclic radicals

preferably belong to the 3,3-dimethylindolenine, imidazole, benzimidazole, pyrazole, indazole, oxazole, benzoxazole, thiazole, benzthiazole, 1,3,4-thiadiazole, 1,2,4- triazole, pyridine, quinoline, pyrimidine or quinazoline series and these radicals can carry substituents, preferably non-ionic substituents, such as $C_1$-$C_4$-alkyl, $C_1$—$C_2$-alkoxy, amino, nitro, chlorine, bromine, cyano or phenyl.

When X denotes =C(W)—,

preferably represents a radical of the formula

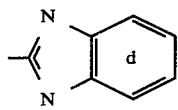

wherein
Z represents O, S, $NR^1$, $C(CH_3)_2$ or —NH—CO— and
$R^1$ represents hydrogen or alkyl.

Preferred substituents in the ring d are, for example, 1-2 $C_1$-$C_4$-alkyls, including trifluoromethyl, 1 $C_1$-$C_4$-alkoxy, 1-2 chlorines or 1 bromine, cyano, cyclohexyl, phenyl, phenyl-$C_1$-$C_3$-alkyl, $C_1$-$C_4$-alkylsulphonyl, phenylsulphonyl or $SO_2T$, in which T has the above-mentioned meaning.

As further substituents, the ring a can contain, for example, chlorine, bromine, $C_1$—$C_2$-alkyl or a radical of the type Q-S- and the ring b can contain, for example $C_1$—$C_2$-alkoxy, chlorine, bromine or a radical of the type Q-S-.

Preferred alkyl radicals $W^1$, $W^2$ and $W^3$ contain 1-4 C atoms and, in particular, $W^3$ can also contain 1 substituent, such as $C_1$-$C_4$-alkoxy or chlorine. Particularly preferred alkyl radicals $W^1$, $W^2$ and $W^3$ are methyl, ethyl, n-propyl and n-butyl. W preferably represents CN, $COOC_1$—$C_2$-alkyl or COOH and in particular represents CN.

Preferred dyestuffs of the formula I correspond to the formula

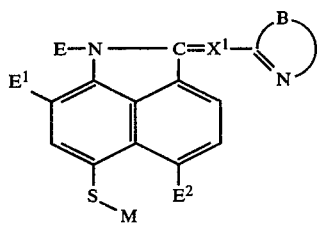

wherein
E represents hydrogen, methyl, ethyl, β-cyanoethyl, β-chloroethyl, β-acetoxyethyl, β-methoxyethyl, β-ethoxyethyl, β-hydroxyethyl, β-carbomethoxyethyl, β-carboethoxyethyl, n-propyl, isopropyl, n-butyl, n-pentyl, benzyl, β-phenylethyl or phenyl or conjointly with $E^1$ represents —$CH_2$—$CH_2$—$CH_2$—,
M represents a phenyl radical which is optionally monosubstituted to pentasubstituted by chlorine, monosubstituted to disubstituted by bromine, monosubstituted to disubstituted by $C_1$-$C_4$-alkyl or monosubstituted by phenyl, methoxy, ethoxy, phenoxy, a carboxylic acid $C_1$—$C_2$-alkyl ester, amino or acetylamino, or a naphthyl group or conjointly with $E^2$ represents a o-phenylene radical which is optionally substituted by methyl, chlorine, bromine, methoxy or ethoxy,
$E^1$ represents hydrogen, ethyl, chlorine, bromine or phenylmercapto or its methyl or chlorine derivative,
$E^2$ represents hydrogen, chlorine, bromine, methoxy, ethoxy or phenylmercapto or its methyl or chlorine derivative,
$X^1$ represents =C(W')— or =N—,
W' represents CN, COOH, COO—$C_1$—$C_2$-alkyl or a

radical and
B represents the remaining members of a radical of the thiazole-(2)-, 1,2,4-thiadiazole-(3)-, 1,3,4-thiadiazole-(2)-, 1,2,4-triazole-(3)-, pyrimidine-(2)-, quinoline-(2)-, 3,3-dimethylindolenine-(2)-pyridine-(2)-, benzthiazole-(2)-, benzoxazole-(2)- or benzimidazole-(2)- series, which can contain, as substituents, 1-2 $C_1$-$C_4$-alkyls, 1-2 chlorines or 1 bromine, $C_1$—$C_2$-alkoxy, $C_1$—$C_2$-alkylsulphonyl, di($C_1$—$C_2$-alkyl)-aminosulphonyl, phenyl, cyclohexyl, nitro or amino.

When X==C(W')—, B preferably represents the remaining members of a radical of the formula

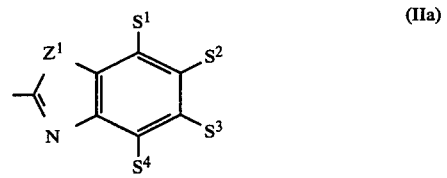 (IIa)

wherein
$Z^1$ represents O, S, NH or $C(CH_3)_2$,
$S^1$ represents hydrogen or methyl or, conjointly with $S^2$, represents —CH=CH—CH=CH—,
$S^2$ represents hydrogen, $C_1$-$C_4$-alkyl, cyclohexyl, phenyl, chlorine, bromine, $C_1$—$C_2$-alkoxy, $C_1$—$C_2$-alkoxy, carbonyl, $C_1$—$C_2$-alkylsulphonyl or di-$C_1$—$C_2$-alkyl-amino,
$S^3$ represents hydrogen, $C_1$—$C_2$-alkoxy, methyl, chlorine or di-$C_1$—$C_2$-alkylamino-sulphonyl and
$S^4$ represents hydrogen or chlorine.

When X==N—, B preferably represents the remaining members of a thiazole-(2)-, 1,2,4-thiadiazole-(3)-, 1,3,4-thiadiazole-(2)-, 1,2,4-triazole-(3)-, pyrimidine-(2)-, quinoline-(2)- radical, and especially of a pyridine-(2)- or benzthiazole-(2)- racical, which radicals are optionally substituted by methyl, chlorine, bromine, $C_1$—$C_2$-alkoxy, nitro, amino or phenyl.

Preferred substituents for the two last-mentioned ring systems are methoxy, ethoxy, methyl, chlorine and amino.

Compounds which are particularly valuable industrially correspond to the formula

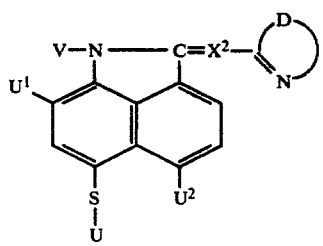

(III)

wherein

V represents hydrogen, methyl, ethyl, β-cyanoethyl, β-chloroethyl, n-propyl, n-butyl, benzyl or β-phenylethyl, U represents a phenyl radical which is optionally monosubstituted to pentasubstituted by chlorine, monosubstituted to disubstituted by bromine, monosubstituted to disubstituted by methyl or monosubstituted by p-tertiary-butyl, methoxy or amino, or a naphthyl group or, conjointly with $U^2$, represents a o-phenylene radical which is optionally substituted by methyl, chlorine, bromine, methoxy or ethoxy, $U^1$ and $U^2$ each represent hydrogen, chlorine, bromine, phenylmercapto, tolylmercapto or chlorophenylmercapto, $X^2$ represents $=C(CN)-$, $=C(COO-C_1-C_2\text{-alkyl})-$ or $=N-$ and D represents the remaining members of a pyridyl-(2)- or 6-aminopyridyl-(2)- radical or of an azole radical of the formula

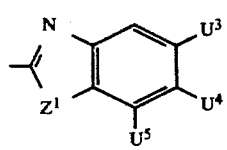

(IV)

wherein $Z^1$ represents O, S or NH $U^3$ represents hydrogen, methyl, p-tertiary-butyl, methoxy, chlorine, phenyl or ethylsulphonyl, $U^4$ represents hydrogen, methyl, methoxy, ethoxy or chlorine and $U^5$ represents hydrogen or chlorine.

When $X==N-$, $Z^1$ preferably represents S and V, $U^3$ and $U^5$ preferably represent hydrogen.

When $X^2==C(CN)-$ or $=C(COO-C_1-C_2\text{-alkyl})-$, D preferably represents the remaining members of an azole radical of the formula IV.

Particularly preferred radicals V are methyl and ethyl, as well as hydrogen.

The new compounds of the formula I can be prepared according to methods which are in themselves known. One of the processes is to subject compounds of the formula

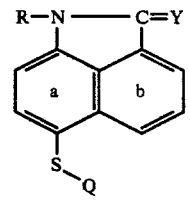

(V)

wherein

R, Q, a and b have the abovementioned meaning and Y represents $=O$, $=Cl_2$ or $=S$ or its $S-C_1-C_3$-alkyl derivative, to a condensation reaction with compounds of the formula

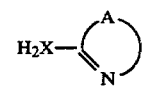

(VI)

wherein

X and A have the abovementioned meaning.

The condensation reaction is carried out under conditions which are in themselves known, such as are indicated, for example, in German Offenlegungsschriften (German Published Specifications) No. 2,357,442, 1,931,789 and 1,569,692/3, German Patent Specification 1,247,513 and French Patent Specification No. 1,388,599. When $Y=0$, the condensation reaction is carried out in the presence of $POCl_3$ in an inert organic solvent, such as chlorobenzene, dichlorobenzene or perchloroethylene, in the temperature range of 60°–140° C., and preferably at 80°–115° C. The components V and VI are employed in an approximately molar ratio and, in general, an excess of VI (for example 2–15%) is not troublesome.

The molar ratio of $POCl_3$ to the components V and VI can be about 0.65–1.1 to 1, but a larger excess is also not troublesome.

The dyestuffs are frequently obtained primarily in the form of their acid salts, which are converted into the neutral form by subsequent treatment with customary acid-binding agents, such as $K_2CO_3$, $NaHCO_3$ or pyridine, or in some cases are also already converted into the neutral form during recrystallisation from a polar solvent, such as ethylglycol or dimethylformamide. However, it is also possible to prepare such dyestuffs direct in this desired form if the reaction is from the start carried out in the presence of a tertiary base, such as a tri-($C_1$-$C_4$-alkyl)-amine or pyridine.

When $X=Cl_2$ or S, or its $S$-$C_1$-$C_3$-alkyl derivative, the components are appropriately heated, without a condensing agent, in an inert solvent to temperatures of about 65°–160° C. and preferably 80°–130° C.

Examples of inert solvents which can be used are: benzene, toluene, xylene, chlorobenzene, dichlorobenzene, dichlorotoluene, chloroform, 1,2-dichloroethane, perchloroethylene, dimethylformamide, dimethylacetamide, dimethylsulphoxide, sulpholane, butyrolactone, glycol monomethyl ether, glycol monoethyl ether or pyridine.

When $Y==\oplus S-C_1-C_3\text{-alkyl}$, $\text{anion}^\ominus$, acid acceptors are appropriately additionally employed. Acid acceptors which can be used are organic bases, such as pyridine, triethylamine or diethylaniline, dimethylformamide or inorganic acid-binding agents, such as potassium carbonate, sodium bicarbonate, magnesium oxide, calcium carbonate, sodium carbonate, sodium methylate or potassium hydroxide.

A second process is to react dyestuffs of the formula

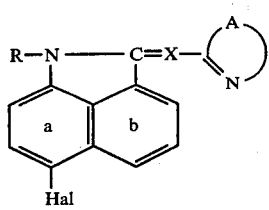

wherein
R, A, X, a and b have the abovementioned meaning and
Hal represents a chlorine or iodine atom or, preferably, a bromine atom,
with mercapto compounds of the formula $$-SH \quad (VIII)$$

ps wherein
Q has the abovementioned meaning,
and an inorganic or organic base and optionally to cyclise the reaction products.

Organic solvents which are preferably used are polar and aprotic or protic but free from groups which have an acid reaction in water. The reaction is carried out in the temperature range of 50°-185° C., preferably 85°-120° C. Bases which can be used are the customary hydroxides, carbonates, alcoholates or acetates of alkali metals or of ammonia, such as sodium hydroxide, potassium hydroxide, sodium carbonate, potassium carbonate, ammonium hydroxide, sodium methylate or potassium acetate, or organic bases, especially tertiary organic bases, such as pyridine or triethylamine, and also anion exchange resins. The components and the base are employed in an approximately equivalent ratio.

The cyclisation to give those compounds of the formula I in which Q represents an o-arylene radical linked to the adjacent peri-position of ring b, is carried out according to methods which are in themselves known (such as are described, for example, in German Offenlegungsschrift (German Published Specification) 2,233,937), by diazotisation and a Sandmeyer reaction with Cu-II salts.

The starting compounds for the processes of preparation mentioned are either known or can be prepared according to known processes. Compounds of the formula VIII are described in German Offenlegungsschrift (German Published Specification) No. 2,233,937.

Compounds of the formula VI in which X denotes =C(W)— are described, for example, in German Auslegeschriften (German Published Specifications) 1,201,354, 1,207,937 and 2,005,933, in German Offenlegungsschriften (German Published Specifications) 1,931,789, 2,065,552 and 2,232,449 and also in Journal Org. Chem. 35, (1970) 3114-3119 and in Chem. Abstracts 67, (1967) 64 126 m, compounds of the formula V are described in German Offenlegungsschriften (German Published Specification) Nos. 2,233,937, 2,428,198 and 2,429,760 and compounds of the formula VII are described in German Offenlegungsschriften (German Published Specification) Nos. 2,357,442 and 1,931,789 and also in French Patent Specification No. 1,388,599.

The halogenation can be carried out before or after the condensation reaction with VI. Most of the mercapto compounds of the formula QSH are generally known compounds. Optionally substituted thiophenols are described, for example, in German Offenlegungsschrift (German Published Specification) No. 2,116,978 or can be prepared easily from aromatic sulphochlorides under the conditions indicated in that specification.

The dyestuffs of the formula I which contain cationic groups are very suitable for dyeing and printing acid-modified substrates, such as polyacrylonitrile, acid-modified polyester fibres or acid-modified polyamides and also for dyeing paper.

Dyestuffs of the formula I which contain acid groups are particularly suitable for dyeing and printing polyamides and wool.

The preferred dyestuffs of the formula I, which are free from ionic groups, are, for example, valuable disperse dyestuffs, with which it is possible advantageously to dye and print hydrophobic fibre or fabric materials. Because of their good heat stability, these dyestuffs are suitable for bulk dyeing polymeric organic materials, such as polystyrene. The dyestuffs of the formula I possess particularly valuable properties on or in polyester materials, especially those made of polyethylene glycol terephthalates. Brilliant dyeings or prints in the orange, red, violet and blue range are obtained and most of these are distinguished by a good affinity and good fastness properties, in particular very good fastness to light. Comparable dyestuffs which have been proposed hitherto do not possess these advantages to the same degree.

Sublimable dyestuffs of the formula I, that is to say those which are free from ionic substituents and substituents which render the dyeings fast to sublimation, such as sulphamoyl radicals, are also suitable for dry thermal dyeing and printing processes, especially for so-called transfer printing.

EXAMPLE 1

61 g of 1-ethyl-6-phenylmercapto-benz[c.d]indolin-2-one, the preparation of which is described in German Offenlegungsschrift (German Published Specification) 2,233,937, and 40 g of benzthiazolyl-2-acetamide are suspended in 280 ml of anhydrous chlorobenzene, 60 g of phosphorus oxychloride are added dropwise at 90° C. and the mixture is stirred for 6 hours at 105° C. After cooling to room temperature, the crystalline precipitate is filtered off, washed with toluene and dissolved in 500 ml of dimethylformamide at 60° C., the solution is added slowly dropwise to 1.5 liters of 8% strength NaHCO₃ solution and the mixture is stirred for 3 hours at room temperature. The precipitate is filtered off, washed with water, recrystallised from ethylene glycol monoethyl ether, washed with ethanol and dried in vacuo at 60° C. 68 g of the compound of the formula

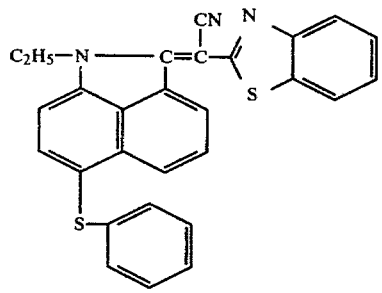

(1)

are obtained as a dark red crystalline powder. A dyeing on polyester fibres (130° C.) displays a red colour shade with good fastness properties.

The dyestuffs of the formula

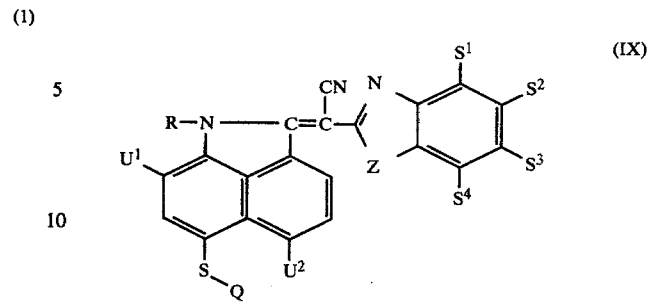

(IX)

which are listed in the Table which follows are prepared in an analogous manner:

| Example No. | R | $U^1$ | Q | $U^2$ | z |
|---|---|---|---|---|---|
| (2) | $CH_3$ | H | ⟨⟩—Cl | H | O |
| (3) | $CH_2$—$C_6H_5$ | —S—⟨⟩—$CH_3$ | ⟨⟩—$CH_3$ | H | O |
| (4) | n-$C_4H_9$ | Cl | ⟨⟩—$C(CH_3)_3$ | H | S |
| (5) | $C_2H_4CN$ | H | ⟨⟩—$OCH_3$ | Br | O |
| (6) | n-$C_3H_7$ | H | ⟨⟨⟩⟩ (naphthyl) | H | O |
| (7) | $C_2H_4Cl$ | H | ⟨⟩ with $CF_3$ and Cl | $OC_2H_5$ | S |
| (8) | $C_2H_4COOCH_3$ | H | ⟨⟩—Br | $OCH_3$ | N–H |
| (9) | $C_2H_5OC_6H_4$ | Br | ⟨⟩—NH—$COCH_3$ | H | O |
| (10) | $C_2H_4COOC_2H_4$ | H | ⟨⟩ with Cl, Cl | H | S |
| (11) | n-$C_5H_{11}$ | H | ⟨⟩ with Cl, Cl, Cl, Cl, Cl | H | O |
| (12) | H | $C_2H_5$ | ⟨⟩ | H | O |
| (13) | $C_2H_5$ | H | ⟨⟩—$CH_3$ | H | O |
| (14) | $CH_3$ | —S—⟨⟩ | ⟨⟩ | H | S |
| (15) | $C_2H_4CON(CH_3)_2$ | —S—⟨⟩—Cl | ⟨⟩—Cl | H | O |
| (16) | $C_2H_5$ | H | ⟨⟩ | —S—⟨⟩ | O |

-continued

| | | | | |
|---|---|---|---|---|
| (17) | H | H | ![2,4-dimethylphenyl] | H | C(CH3)2 |
| (18) | C2H4CN | Cl | ![4-ethoxyphenyl]—OC2H5 | H | O |

| Example No. | S¹ | S² | S³ | S⁴ | Colour shade (polyester) 130° C. |
|---|---|---|---|---|---|
| (2) | H | CH3 | H | H | red |
| (3) | H | Cl | H | Cl | red |
| (4) | H | H | OC2H5 | H | red |
| (5) | H | C(CH3)3 | H | H | red |
| (6) | H | SO2C2H5 | H | H | red |
| (7) | H | H | OCH3 | H | red |
| (8) | H | H | Cl | H | red |
| (9) | H | CH3 | CH3 | H | red |
| (10) | H | H | Cl | H | red |
| (11) | CH3 | H | H | H | red |
| (12) | H | ⟨phenyl⟩ | | H | red |
| (13) | | —CH=CH—CH=CH— | H | H | red |
| (14) | H | Br | H | H | red |
| (15) | H | H | H | H | red |
| (16) | H | ⟨H-phenyl⟩ | | H | red |
| (17) | H | H | H | H | red |
| (18) | H | Br | H | H | red |

EXAMPLE 19

44.7 g of 1-ethyl-2-methylmercapto-6-phenylmercaptobenz[c.d]indolium methosulphate are suspended in 350 ml of ethylene glycol monoethyl ether, 9 g of pyridine and 20.4 g of 6-methoxybenzthiazolyl-2-acetonitrile are added and the mixture is warmed to 100° C. for 3 hours and cooled. The crystalline precipitate is filtered off, washed with ethanol and dried in vacuo at 60° C. 32 g of the compound of the formula

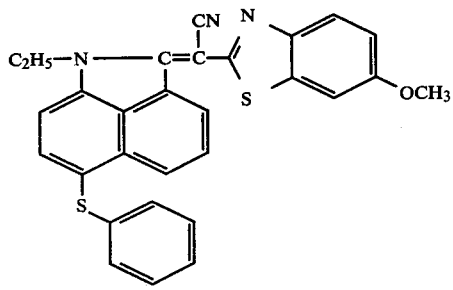

(19)

are obtained as a dark red crystalline powder. On polyester fibres (130° C.), the dyestuff gives a red colour shade which has good fastness properties.

EXAMPLE 20

22.6 g of the compound of the formula

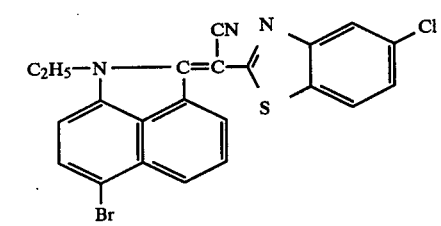

(20a)

which is prepared by the method indicated in Example 21 of German Offenlegungsschrift (German Published Specification) 2,357,442, are suspended in 400 ml of dimethylformamide, 7.2 g of potassium carbonate and 6.3 g of thiophenol are added, the mixture is heated to the boil under reflux for 10 minutes and discharged into 1 kg of 5% strength acetic acid and the resulting mixture is stirred for 15 minutes. The crystalline precipitate is filtered off, washed with water, recrystallised from 560 ml of ethylene glycol monomethyl ether, washed with ethanol and dried in vacuo at 60° C. 21 g of the compound of the formula

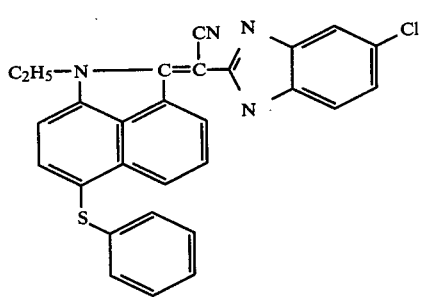

(20)

are obtained as a dark red crystalline powder. On polyester fibres (130° C.), the dyestuff gives a red colour shade which has good fastness properties. The dyestuffs of the formula IX, which are listed in the Table which follows are obtained in an analogous manner.

at 210° C.), a reddish-tinged blue colour shade which has good fastness properties is obtained.

The dyestuffs of the formula (X)

(X)

| Ex. | R | $U^1$ | Q | $U^2$ | Z | $S^1$ | $S^2$ | $S^3$ | $S^4$ | Colour shade (polyester) 130° C. |
|---|---|---|---|---|---|---|---|---|---|---|
| (21) | —CH₃ | H | ⌬-H₂N | H | O | H | OC₂H₅ | H | H | red |
| (22) | —C₂H₄OH | H | ⌬-OCH₃/H₂N | H | O | H | SO₂N(CH₃)₂ | H | H | red |
| (23) | —C₂H₄OCH₃ | H | ⌬-OC₂H₅/H₂N | H | O | H | ⌬-H | H | H | red |
| (24) | C₂H₄Cl | —S-⌬ | ⌬ | H | S | H | Br | H | H | red |
| (25) | n-C₃H₇ | —S-⌬-Cl | ⌬-Cl | H | C(CH₃)₂ | H | H | H | H | red |
| (26) | —CH₂—CH₂—CH₂— | | ⌬ | —S-⌬ | O | H | OCH₃ | H | H | red |
| (27) | CH₃ | H | ⌬-CH₃/CH₃ | H | \N/ H | H | CH₃ | SO₂N(C₂H₅)₂ | H | red |
| (28) | C₂H₅ | H | ⌬ | H | —NH—C(=O)— | H | H | H | H | red |

EXAMPLE 29

14 g of 5-chloro-benzoxazolyl-acetamide are added to 19 g of N-ethyl-4-amino-benz[k,l]thioxanthenyl-3-carboxylic acid lactam in 140 ml of anhydrous chlorobenzene and 8 g of phosphorus oxychloride are added at 80° C. and the mixture is stirred for 5 hours at 100° C. After cooling to room temperature, the crystalline precipitate is filtered off, washed with toluene, recrystallised from 200 ml of N-methylpyrrolidone, washed with dimethylformamide and then with ethanol and dried in vacuo at 80° C. 8 g of the compound of the formula (29)

are obtained as a luminous blue crystalline powder. On polyester (pad-thermosol process, fixing for 30 seconds

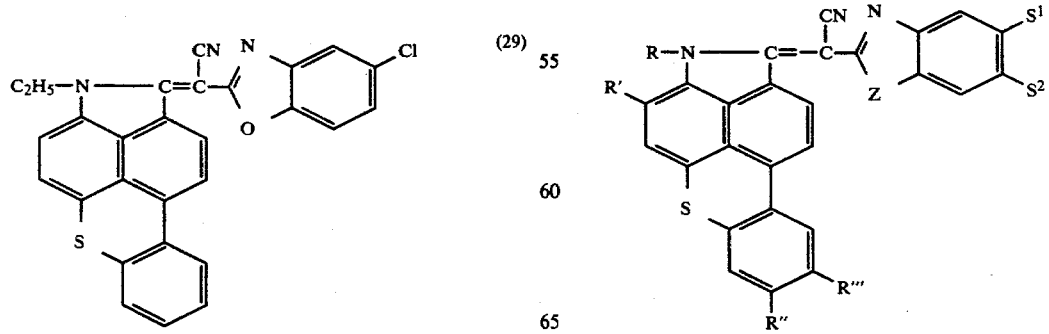

which are listed in the Table which follows are obtained in an analogous manner:

| Example No. | R | R' | R" | R''' | Z | $S^1$ | $S^2$ | Colour shade on polyester |
|---|---|---|---|---|---|---|---|---|
| (30) | CH₃ | H | OCH₃ | H | S | H | H | reddish-tinged blue |
| (31) | C₂H₄CN | H | OC₂H₅ | H | S | H | OC₂H₅ | reddish-tinged blue |
| (32) | C₂H₄Cl | Cl | Cl | H | O | CH₃ | H | reddish-tinged blue |
| (33) | C₂H₄COOCH₃ | H | Br | H | O | H | H | reddish-tinged blue |
| (34) | n-C₄H₉ | H | CH₃ | H | NH | Cl | H | reddish-tinged blue |
| (35) | CH₂—C₆H₅ | H | H | Cl | C(CH₃)₂ | H | H | reddish-tinged blue |
| (36) | n-C₃H₇ | H | H | Br | O | C₂H₅SO₂ | H | reddish-tinged blue |
| (37) | H | C₂H₅ | H | H | S | H | H | reddish-tinged blue |
| (38) | —CH₂—CH₂—CH₂— | | | H | O | CH₃ | CH₃ | reddish-tinged blue |

EXAMPLE 39

38 g of the compound of the formula

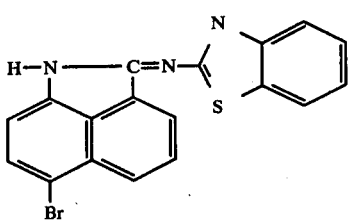 (39a)

the preparation of which is indicated in Example 7 of French Patent Specification No. 1,388,599, are suspended in 1,000 ml of dimethylformamide, 15 g of potassium carbonate and 12.1 g of thiophenol are added, the mixture is heated to the boil for 30 minutes and cooled and 10 g of glacial acetic acid are added. The crystalline precipitate is filtered off, washed, first with ethanol and then with water, and dried in vacuo at 70° C. 36 g of the compound of the formula

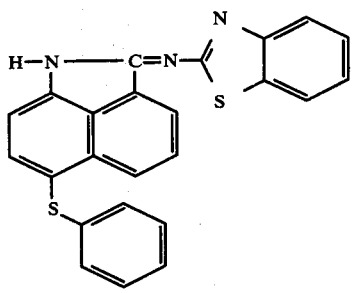 (39)

are obtained as an orange-coloured crystalline powder. On polyester fibres, the dyestuff gives a brilliant orange colour shade which has good fastness properties. The dyestuffs of the formula

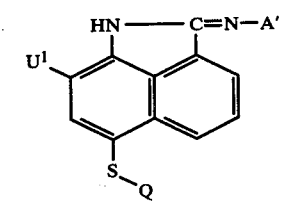 (XI)

which are listed in the Table which follows are prepared in an analogous manner:

| Example No. | $U^1$ | Q | A' | Colour shade (polyester) 130° C. |
|---|---|---|---|---|
| (40) | H | ![p-Cl-phenyl] | ![benzothiazole] | brilliant yellowish-tinged orange |
| (41) | H | ![p-CH₃-phenyl] | ![benzothiazole] | brilliant yellowish-tinged orange |
| (42) | —S—C₆H₅ | ![phenyl] | ![benzothiazole] | billiant red-orange |
| (43) | Br | ![p-C(CH₃)₂-phenyl] | ![5-Br-benzothiazole] | brilliant orange |
| (44) | C₂H₅ | ![naphthyl] | ![5-Cl-benzothiazole] | brilliant orange |

-continued

| Example No. | U¹ | Q | A' | Colour shade (polyester) 130° C. |
|---|---|---|---|---|
| (45) | H | 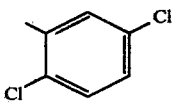 | 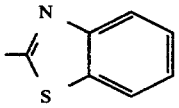 | brilliant yellowish-tinged orange |
| (46) | H | 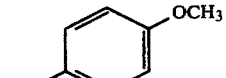 | 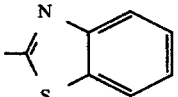 | red-orange |
| (47) | Cl | 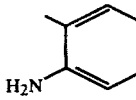 | 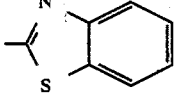 | reddish-tinged orange |
| (48) | 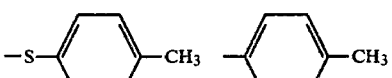 |  | 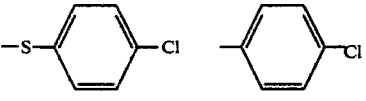 | brilliant red-orange |
| (49) | 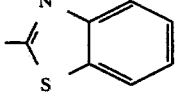 | 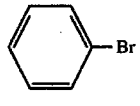 | 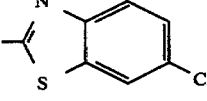 | brilliant red-orange |
| (50) | H | 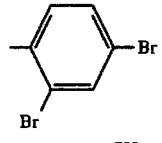 | 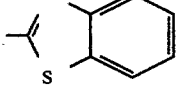 | brilliant yellowish-tinged orange |
| (51) | H | 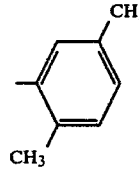 | 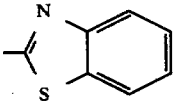 | brilliant yellowish-tinged orange |
| (52) | Cl | 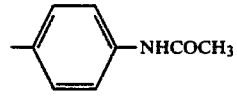 | 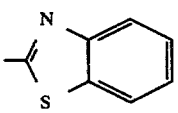 | brilliant orange |
| (53) | H | 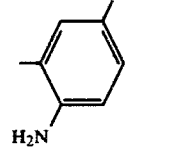 | 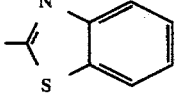 | reddish-tinged orange |
| (54) | H | 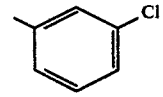 | 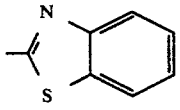 | red-orange |
| (55) | H | 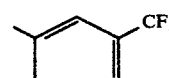 | 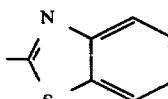 | brilliant yellowish-tinged orange |
| (56) | H | 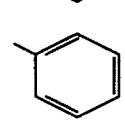 | 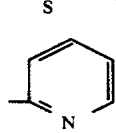 | brilliant yellowish-tinged orange |
| (57) | H | | | brilliant orange |

-continued

| Example No. | $U^1$ | Q | A' | Colour shade (polyester) 130° C. |
|---|---|---|---|---|
| (58) | H | 4-chlorophenyl | 2-aminopyridin-6-yl | brilliant red-orange |
| (59) | H | 4-methylphenyl | 4-phenyl-2-thiazolyl (imino-C6H5) | yellow-orange |
| (60) | H | phenyl | 1H-1,2,4-triazol-3-yl | yellow-orange |
| (61) | H | 2-chlorophenyl | 5-nitro-2-thiazolyl | yellow-orange |
| (62) | H | phenyl | 2-quinolyl | orange |
| (63) | Cl | 4-chlorophenyl | 5-nitro-2-thiazolyl | yellow-orange |
| (64) | H | phenyl | 2-pyrimidinyl | brilliant orange |

EXAMPLE 65

41 g of the compound of the formula

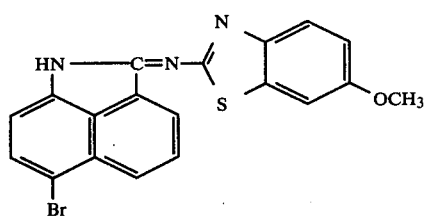
(65a)

the preparation of which is indicated in Example 7 of French Patent Specification No. 1,388,599, are suspended in 850 ml of N-methylpyrrolid-2-one, 15 g of potassium carbonate and 12.1 g of thiophenol are added, the mixture is heated to 180° C., whilst stirring, for 25 minutes, whilst distilling off water-containing solvent, cooled and discharged into 2.5 kg of 5% strength acetic acid and the resulting mixture is stirred for 30 minutes. The crystalline precipitate is filtered off, washed with water, recrystallised from dimethylformamide, washed with ethanol and dried in vacuo at 70° C. 27 g of the compound of the formula

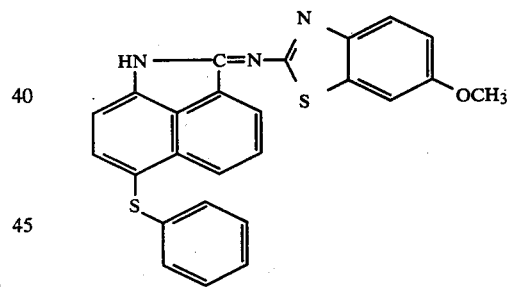
(65)

are obtained as an orange-coloured crystalline powder. On polyester fabric (130° C.), a brilliant orange shade which has good fastness properties is obtained.

If an equivalent amount of the homologous 6-ethoxybenzthiazolyl compound is employed in place of compound (65a), the compound of the formula

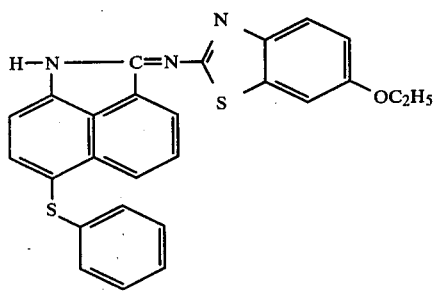
(66)

is obtained in an analogous manner. On polyester, this also displays a very clear orange shade, which has good fastness properties.

Compounds with similarly valuable properties are obtained when an equivalent amount of 4-methylthiophenol, 4-chlorothiophenol, 2-aminothiophenol or 5-methoxy-2-aminothiophenol is employed in place of thiophenol.

The compound of the formula

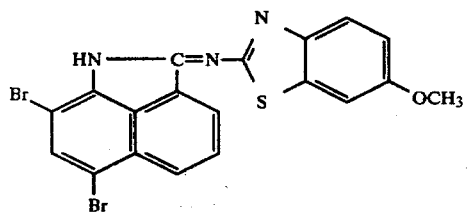
(67a)

is also reacted by the same method with two equivalents of 4-methyl-thiophenol and potassium carbonate in N-methylpyrrolidone to give the compound of the formula

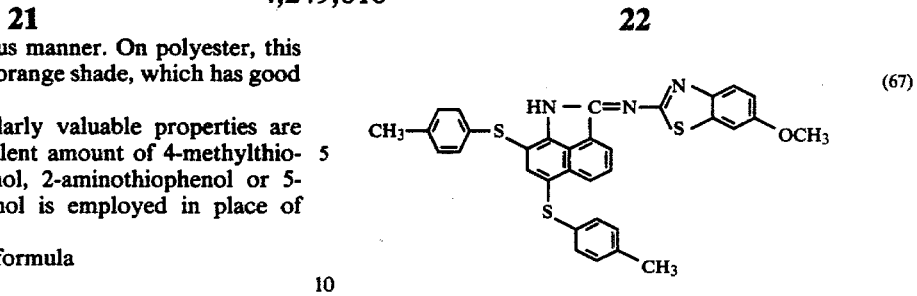
(67)

The substance is a red crystalline powder which, in a dyeing on polyester fibres, gives a brilliant scarlet shade which has good fastness properties. The compounds of the formula

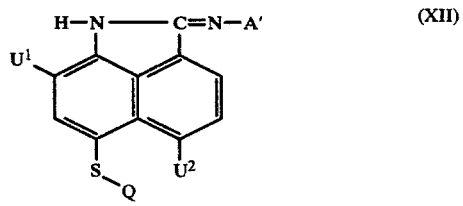
(XII)

which are listed in the Table which follows are prepared in an analogous manner:

| Example No. | $U^1$ | $U^2$ | Q | A' | Colour shade(polyester) 130° C. |
|---|---|---|---|---|---|
| (68) | ⌬—S— | H | ⌬ | benzothiazole-$OC_2H_5$ | brilliant red-orange |
| (69) | Cl—⌬—S— | H | Cl—⌬ | benzothiazole-$OCH_3$ | brilliant red-orange |
| (70) | Br | H | ⌬ | benzothiazole-$OCH_3$ | brilliant orange |
| (71) | H | ⌬—S— | ⌬ | benzothiazole | brilliant reddish-tinged orange |
| (72) | H | Cl—⌬—S— | Cl—⌬ | benzothiazole | brilliant reddish-tinged orange |
| (73) | H | $CH_3$—⌬—S— | $CH_3$—⌬ | benzothiazole | brilliant reddish-tinged orange |
| (74) | H | Br | ⌬ | benzothiazole | brilliant orange |
| (75) | Cl | Cl | ⌬ | benzothiazole-$OCH_3$ | brilliant orange |
| (76) | H | H | $CH_3$—⌬ | pyrimidine | brilliant scarlet |

-continued

| Example No. | $U^1$ | $U^2$ | Q | A' | Colour shade(polyester) 130° C. |
|---|---|---|---|---|---|
| (77) | H | H | Cl–⟨phenyl⟩ | ⟨2-pyridyl⟩ | brilliant red-orange |
| (78) | H | ⟨phenyl⟩–S– | ⟨phenyl⟩ | ⟨2-amino-pyridyl⟩ | red-orange |

EXAMPLE 79

27.5 g of 4-amino-benz[k,l]thioxanthenyl-3-carboxylic acid lactam, the preparation of which is described in Example 68 of German Offenlegungsschrift (German Published Specification) 2,233,937, and 15 g of 2-aminobenzthiazole are suspended in 200 ml of anhydrous chlorobenzene, 17 g of POCl$_3$ are added dropwise at 100° C. and the mixture is stirred for 3 hours at 105° C. After cooling to room temperature, the crystalline precipitate is filtered off, washed with toluene, recrystallised from dimethylformamide, washed with ethanol and dried in vacuo at 70° C. 3.3 g of the compound of the formula

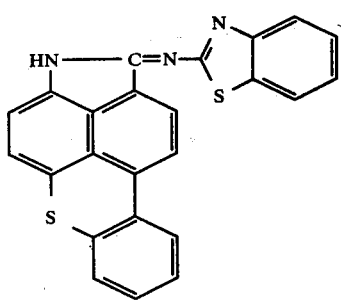
(79)

are obtained as a dark red crystalline powder. On polyester fibres (130° C., under the autogenous pressure), the dyestuff displays a brilliant red colour shade which has good fastness properties.

Dyestuffs which have similarly valuable properties are obtained when an equivalent amount of 6-methoxy-2-aminobenzthiazole, 6-ethoxy-2-aminobenzthiazole, 2-aminopyridine or 2,6-diaminopyridine is employed in place of 2-aminobenzthiazole.

EXAMPLE 80/81

21.3 g of the compound of the formula

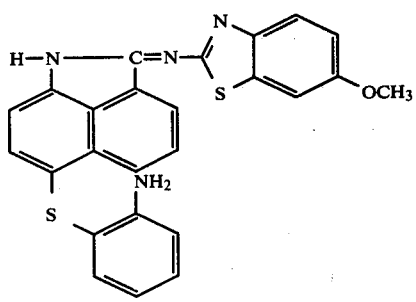
(80)

which is accessible by the method indicated in Example (65), are dissolved in 150 g of hot glacial acetic acid, 25 ml of water and 15 g of concentrated hydrochloric acid are added and a diazotisation reaction is carried out at 0° C. with a solution of 4 g of sodium nitrite in 20 ml of water. The diazonium salt solution is allowed to run into a boiling solution of 50 g of crystalline copper-II sulphate in 500 ml of 10% strength acetic acid. The mixture is boiled for a further 1 hour under reflux and the crystalline precipitate is filtered off hot, washed with water, digested with 400 ml of boiling 10% strength Trilon-B solution; in order to remove copper ions, filtered off again, washed with water and dried in vacuo at 70° C. 19 g of the compound of the formula

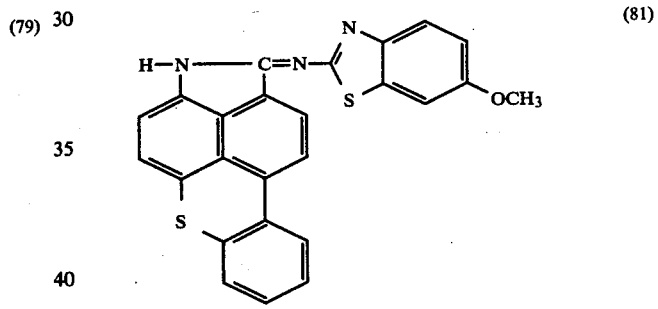
(81)

are obtained as a dark red crystalline powder. On polyester fibres (130° C.), the dyestuff displays a bluish-tinged red colour shade which has good fastness properties.

EXAMPLE 82

The procedure is in accordance with the instructions of Example 1 but an equivalent amount of benzthiazolyl-2-acetic acid ethyl ester is employed in place of benzthiazolyl-2-acetamide. In this way 54 g of the compound of the formula

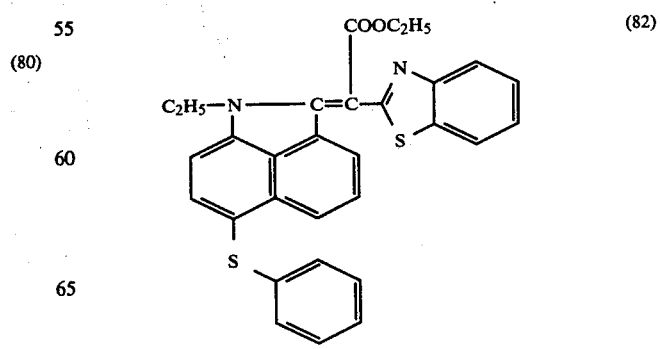
(82)

are obtained as a dark red crystalline powder. A dyeing on polyester fibres (130° C.) displays a red colour shade which has good fastness properties. The dyestuffs of the formula IXa

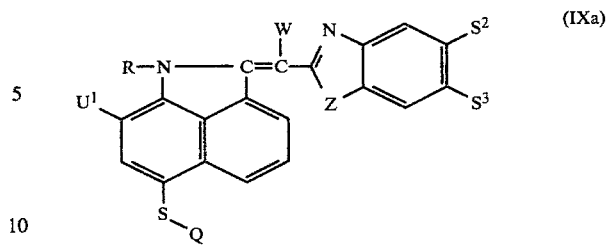
(IXa)

which are listed in the Table which follows are prepared in an analogous manner:

| Example No. | R | $U^1$ | Q | W | % | $S^2$ | $S^3$ | Colour shade (polyester, 130° C.) |
|---|---|---|---|---|---|---|---|---|
| (83) | $CH_3$ | H | —C₆H₄—Cl | $COOCH_3$ | O | $CH_3$ | H | red |
| (84) | H | H | —C₆H₄—CH₃ | $COOC_2H_5$ | S | H | $OCH_3$ | red |
| (85) | $C_2H_4CN$ | H | —C₆H₃(Cl)₂ | —CO—N(piperidine) | O | Cl | H | red |
| (86) | $C_2H_4Cl$ | H | —C₆H₅ | —CO—N(morpholine) | O | $CH_3$ | H | red |
| (87) | $n-C_4H_9$ | Cl | —C₆H₄—C(CH₃)₃ | $—COOC_2H_5$ | NH | Cl | H | red |
| (88) | H | H | —C₆H₅ | $—COO-n-C_4H_9$ | S | H | H | red |
| (89) | H | H | —C₆H₄—CH₃ | CN | O | $C(CH_3)$ | H | red |
| (90) | $CH_3$ | $-S-C_6H_5$ | —C₆H₅ | $—COOC_2H_5$ | O | $OCH_3$ | H | red |
| (91) | $CH_3$ | Br | —C₆H₄—Cl | $CON(CH_3)_2$ | O | $CH_3$ | H | red |
| (92) | $C_2H_5$ | $-S-C_6H_4-CH_3$ | —C₆H₄—CH₃ | $CON(n-C_4H_9)_2$ | O | H | H | red |
| (93) | H | $C_2H_5$ | —C₆H₄—Br | $CONH—CH_3$ | O | $CH_3$ | $CH_3$ | red |
| (94) | H | H | —C₆H₅ | CN | S | | $OC_2H_5$ | red |
| (95) | H | H | —C₆H₅ | benzoxazolyl | O | H | H | red |
| (96) | $C_2H_5$ | H | —C₆H₄—CH₃ | methylbenzoxazolyl | O | $CH_3$ | H | red-violet |
| (97) | $C_2H_5$ | H | —C₆H₅ | benzothiazolyl | S | H | H | red-violet |
| (98) | $C_2H_5$ | H | —C₆H₄—Cl | benzimidazolyl (NH) | O | $CH_3$ | H | red-violet |

-continued

| Example No. | R | U¹ | Q | W | % | S² | S³ | Colour shade (polyester, 130° C.) |
|---|---|---|---|---|---|---|---|---|
| (99) | H | H |  | 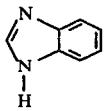 | NH | H | H | red |

EXAMPLE 100

The procedure is in accordance with the instructions of Example 20 but an equivalent amount of the compound of the formula (100a)

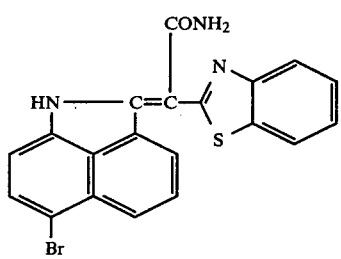

is employed in place of compound (20a).

In this way 24 g of the compound of the formula

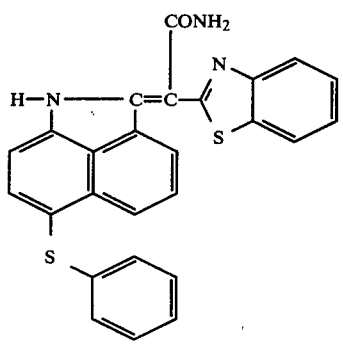

are obtained as a dark rod powder.

Compounds (101) and (102) are also prepared in an analogous manner.

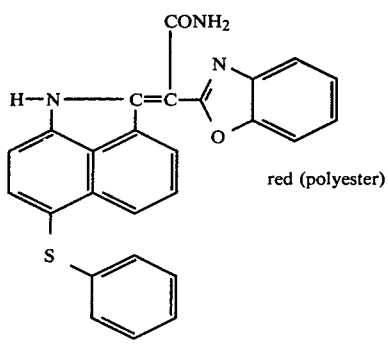

red (polyester)

and

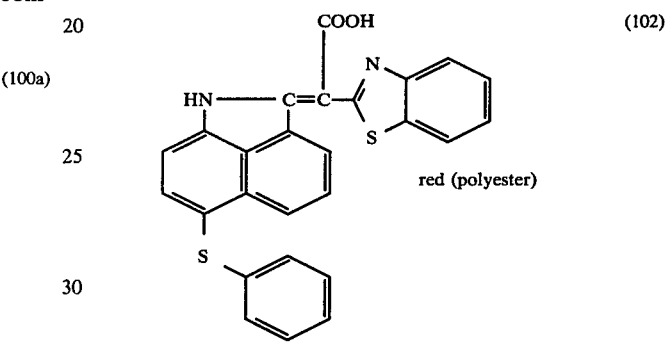

red (polyester)

EXAMPLE 103

The procedure is in accordance with the instructions of Example 29 but an equivalent amount of benzthiazolyl-2-acetic acid ethyl ester is employed in place of 5-chlorobenzoxazolyl-2-acetamide. In this way 9.5 g of the compound of the formula

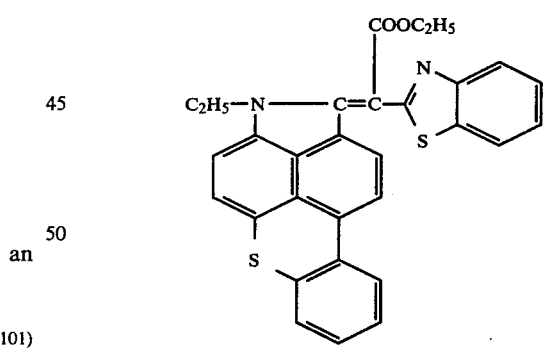

are obtained as a blue crystalline powder. On polyester (30 seconds, 210° C.), a reddish-tinged blue colour shade, which has good fastness properties, is obtained.

Dyestuffs which have similar coloristic properties are obtained when an equivalent amount of 5-chloro-benzoxazolyl-2-acetic acid methyl ester, 5-methyl-benzoxazolyl-2-acetic acid methylamide, benzoxazolyl-2-acetic acid piperidide, 6-methoxy-benzthiazolyl-2-acetic acid ethyl ester or benzimidazolyl-2-acetic acid ethyl ester is employed, in each case, in place of benzthiazolyl-2-acetic acid ethyl ester.

I claim:

1. Dyestuff of the formula

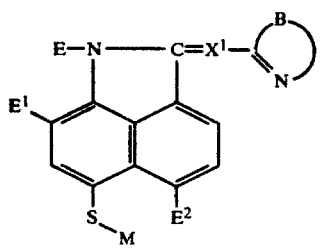

wherein
E represents hydrogen, methyl, ethyl, β-cyanoethyl, β-chloroethyl, β-acetoxyethyl, β-methoxyethyl, β-ethoxyethyl, β-hydroxyethyl, β-carbomethoxyethyl, β-carboethoxyethyl, n-propyl, isopropyl, n-butyl, n-pentyl, benzyl, β-phenylethyl or phenyl;
M represents a phenyl; phenyl monosubstituted to pentasubstituted by chlorine, monosubstituted to disubstituted by $C_1$-$C_4$-alkyl or monosubstituted by phenyl, methoxy, ethoxy, phenoxy, carboxylic acid $C_1$-$C_2$-alkyl ester, amino or acetylamino; or naphthyl;
$X^1$ represents =C(W')—;
W' represents CN, COOH, COO—$C_1$—$C_2$-alkyl or

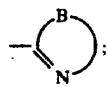

B represents the remaining members of an unsubstituted benzthiazole-(2)-, benzoxazole-(2)- or benzimidazole-(2)— radical or one of the foregoing radicals substituted with 1-2 $C_1$-$C_4$-alkyls; 1-2 chlorines; or one bromine, $C_1$-$C_2$-alkoxy, $C_1$-$C_2$-alkylsulphonyl, di-($C_1$-$C_2$-alkyl)-aminosulphonyl, phenyl, cyclohexyl, nitro or amino;
$E^1$ and $E^2$ independently represent hydrogen, ethyl, chlorine, bromine, phenylmercapto, tolymercapto, or chlorophenylmercapto.

2. Dyestuff according to claim 1 of the formula wherein
V represents hydrogen, methyl, ethyl, β-cyanoethyl, β-chloroethyl, n-propyl, n-butyl, benzyl, or β-phenylethyl;
U represents phenyl; phenyl monosubstituted to penta-substituted by chlorine; monosubstituted to disubstituted by methyl or bromine, monosubstituted by p-tertiary-butyl, methoxy or amino; or naphthyl;
$U^1$ and $U^2$ each represent hydrogen, chlorine, bromine, phenylmercapto, tolylmercapto or chlorophenylmercapto;
$X^2$ represents =C(CN)—, or =C(COO—$C_1$-$C_2$-alkyl)—;
$Z^1$ represents O, S or NH:
$U^3$ represents hydrogen, methyl, p-tertiary-butyl, methoxy, chlorine, phenyl or ethylsulphonyl;
$U^4$ represents hydrogen, methyl, methoxy, ethoxy or chlorine; and
$U^5$ represents hydrogen or chlorine.

3. Dyestuff according to claim 1 of the formula

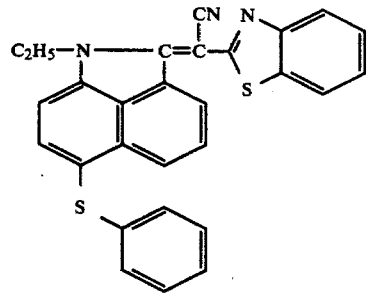

* * * * *